United States Patent [19]

Pecora

[11] 4,110,861

[45] Sep. 5, 1978

[54] TIRE CLEANING APPARATUS

[76] Inventor: Daniel Pecora, 456 Kensington Ct., Palatine, Ill. 60067

[21] Appl. No.: 794,563

[22] Filed: May 6, 1977

[51] Int. Cl.² ............................................. B60S 3/06
[52] U.S. Cl. ...................................... 15/53 B; 15/183
[58] Field of Search ................ 15/179, 181, 182, 183, 15/53 A, 53 AB, 53 B

[56] References Cited

U.S. PATENT DOCUMENTS

| 2,978,726 | 4/1961 | Park ........................................ 15/183 |
| 3,139,641 | 7/1964 | Grogan .................................... 15/182 |
| 3,167,800 | 2/1965 | Mundo .................................... 15/179 |
| 3,393,418 | 7/1968 | Mundo .................................... 15/183 |

Primary Examiner—Edward L. Roberts
Attorney, Agent, or Firm—Irving Faber

[57] ABSTRACT

This invention relates to a new and useful tire cleaning apparatus used in and for automatic car washes. The apparatus is comprised of a shaft having coupled thereto a pair of split end adapters and a core element which carries the brush filaments positioned between said adapters. The adapters and core have means for enabling the shaft to pass therethrough; said adapters and core frictionally engaging the shaft.

5 Claims, 6 Drawing Figures

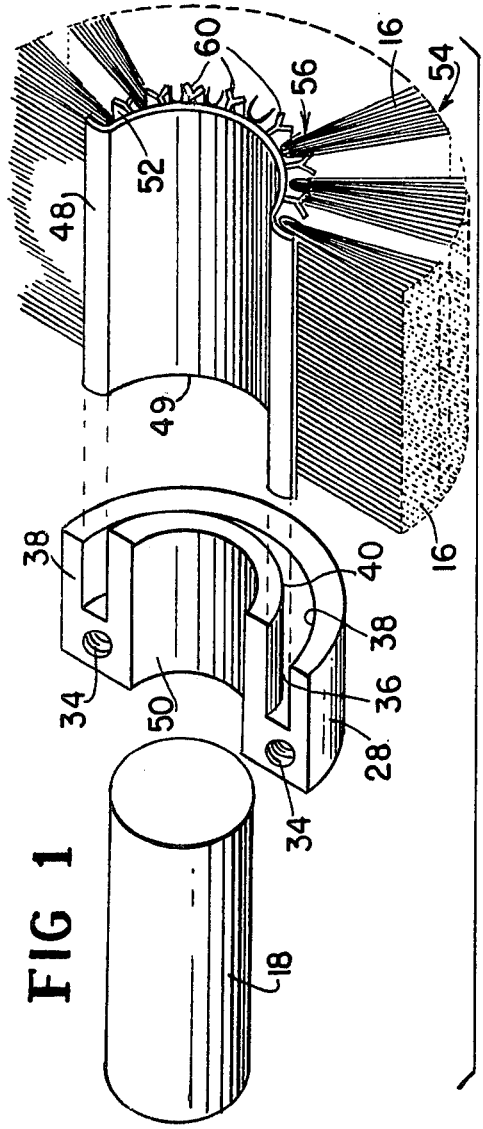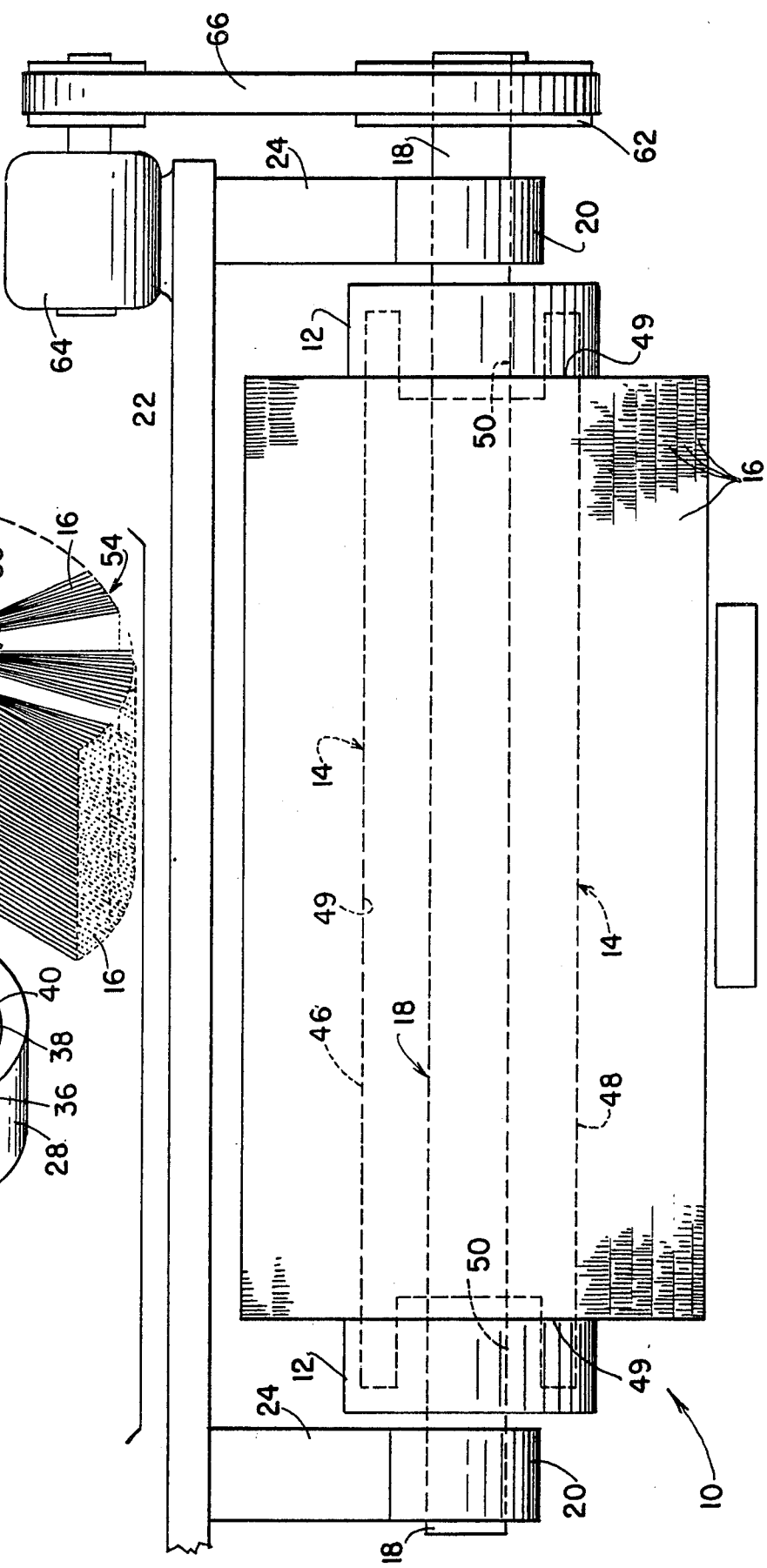

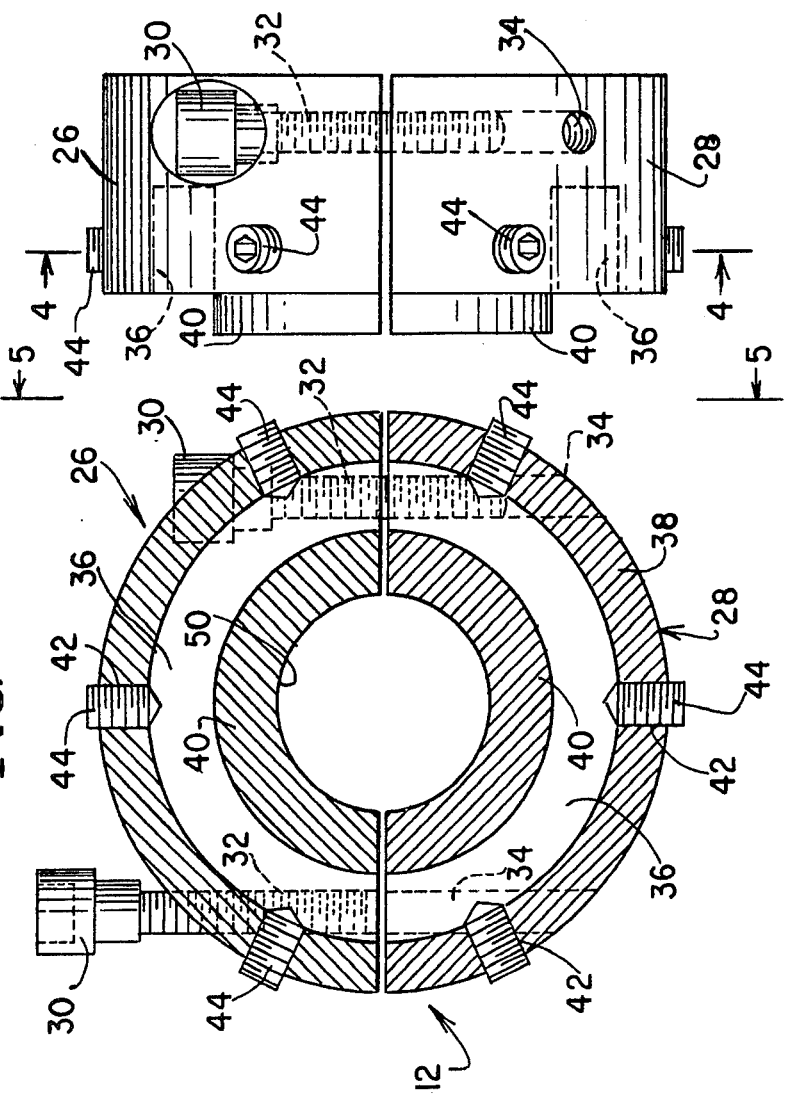
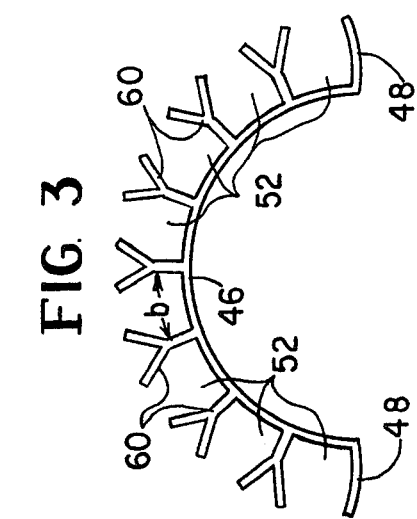
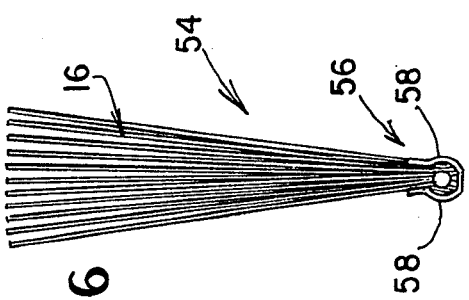

TIRE CLEANING APPARATUS

BACKGROUND OF INVENTION

The automatic car wash industry has grown many fold over in the last 10 years. Most car owners at one time or another have had their car put through an automatic car wash. One of the most vulnerable parts of the automatic car wash apparatus are the brushes that clean the tires. Prior to my invention the brush elements were attached to a core element that was press fit over a keyed shaft. The keyed shaft was positioned through a bearing at each of its ends. The major problem was when it came time to replace the brushes. The changing of brushes necessitated the removal of the shaft from the bearings with its attached core and brush elements. The removal of the shaft from the bearings often resulted in damage to the bearings because of the amount of rust accumulated from the constant exposure to soapy water. The core, when attempted to be slid off the shaft, caused damage to the shaft and at times the shaft broke requiring a new keyed shaft. The new shaft always had to be keyed for or welded to the core being used because the shaft and core had to be locked together for positive rotation of the brushes.

There is a need in the automatic car wash industry for an apparatus that would enable the brush elements to be easily changed without removing the shaft from its retainer bearings thereby avoiding damage to the bearings and the shaft. My invention enables a person to change the brush elements in a fraction of the time it took before, in most situations, approximately 10 minutes. The core with its attached brushes does not require a key slot in the shaft; thus eliminating an expensive milling operation. Further, the core can be adapted to fit shafts of various diameters saving time, material, and money.

I am not aware of any device or apparatus that will enable one to quickly and efficiently change the brush elements for a tire cleaning apparatus without first removing the shaft from its bearings. My tire cleaning apparatus with its split end adapters and split core does not require a keyed shaft and does not affect or disturb the bearings through which the shaft passes. The adapter enables the shaft to pass therethrough while providing means for receiving the split core element with its attached brushes or filaments. To change the worn out brushes on the shaft, the adapter is removed enabling the core and its brushes to be easily lifted from the shaft. New brush elements may be attached to the existing core or a new core and brushes may be used. The old core with new brushes or a new core and brushes is repositioned on the shaft and coupled to the split end adapters. The split end adapters are connected together to frictionally engage the shaft.

In addition to being used as a tire cleaning apparatus my invention can be used on other devices that incorporate rotating brushes or filaments such as for cleaning fruits and vegetables, floor sweepers and polishers, etc.

SUMMARY OF INVENTION

This invention relates to a new and useful tire cleaning apparatus for an automatic car wash facility. My invention is very efficient in that it enables one to quickly change the brushes for the tire cleaning apparatus of an automatic car wash without removing the shaft coupled to said brushes from its retainer bearings. This substantially reduces, if not eliminates, damage to the shaft and its retainer bearings. Further, my invention eliminates the need for having a keyed shaft to fit a specific core, thereby eliminating an expensive milling operation on the shaft.

In my preferred embodiment the tire cleaning apparatus comprises a pair of split end adapters having means for receiving the ends of a split core; the core having the brush filaments or elements coupled thereto and means for receiving and having pass therethrough a shaft. Means are provided for imparting a rotary motion to the shaft. The split core, with its brush elements are positioned over the shaft after which the split end adapters are placed over the shaft engaging each end of the core. Each of the pair of split end adapters are attached together in a manner that frictionally engages the adapter to the shaft and hence the core.

Accordingly, it is an object of this invention to provide a device that will efficiently and effectively enable one to quickly change the brush elements of a tire cleaning assembly of an automatic car wash facility.

Another object of the invention is to provide a device that will substantially reduce the damage to bearings retaining the shaft to which the brushes are coupled to.

Another object of the invention is to provide a device that will enable the replacing of tire cleaning brushes without the necessity of removing the shaft to which they are coupled to.

Another object of the invention is to eliminate the keyed shafts that are presently used in existing tire cleaning assemblies.

IN THE DRAWINGS

FIG. 1 is a cut-away perspective view of the split end adapter, split core and shaft as embodied by the invention.

FIG. 2 is a top view of the split end adapter assembly with the split end adapter as embodied by the invention.

FIG. 3 is an end view of the split core as embodied by the invention.

FIG. 4 is a top view of the split end adapter embodied by the invention.

FIG. 5 is a side elevational view of the split end adapter embodied by the invention taken along lines 5—5.

FIG. 6 is an end view of a brush filament embodied by the invention.

DESCRIPTION OF PREFERRED EMBODIMENT

The preferred embodiment illustrated in the drawings and described herein is not intended to be exhaustive or to limit the invention to the precise form disclosed. It is chosen and described in order to best explain the principles of the invention and its application and practical use to thereby enable others skilled in the art to best utilize the invention.

The improved tire cleaning apparatus embodied by this invention, in its preferred form, is illustrated in the drawings, FIGS. 1 through 6 and is designated generally by the numeral 10. The improved tire cleaning apparatus 10 is comprised of a pair of split end adapters 12, a core 14, brush filaments 16 and a shaft 18. Each end of the shaft 18 is coupled to and positioned within a retainer bearing 20 well known in the art for supporting said shaft and enabling it to rotate therein. The bearings 20 are coupled to a frame 22 by means of bearing retainer arms 24. The frame 22 and bearing retainer arms 24 are of sufficient structural strength to support the tire cleaning apparatus 10 and are generally of a treated metal suitable for inhibiting rust and corrosion; the frame 22 and retainer arms 24 being continually exposed to water and detergents.

The split end adapters 12 are comprised of two semi-circular sections 26 and 28; said sections forming a circular configuration when coupled together by means of threaded bolts 30. The bolts 30 are positioned into threaded apertures 32, 34 of sections 26, 28 respectively, said apertures being suitable for receiving the threaded bolts 30. The semi-circular sections 26, 28 each have a channel or groove 36, said channel or groove being positioned to abut each other when said sections are joined together forming a circular channel or groove having an outer wall 38 and an inner wall 40. A plurality of threaded apertures 42 are positioned through the outer wall 38 for receiving retaining screws 44.

The core 14 comprises two semi-circular sections 46, 48, the ends thereof being suitable for being positioned within the channel 36 of each of the semi-circular sections 26, 28, thus forming a cylindrical core 14 having a circular cross-sectional configuration when sections 26, 28 are coupled together via bolts 30. The semi-circular core sections 46, 48 when coupled together to form the cylindrical core 14 define a core shaft aperture 49 suitable for surrounding the shaft 18. The semi-circular core sections 46, 48 are secured in the groove or channel 36 of the sections 26, 28 via the retaining screws 44 which frictionally engage said core sections.

A shaft aperture 50 is formed when the semi-circular sections 26, 28 are coupled together via threaded bolts 30; the aperture 50 being suitable for receiving the shaft 18. The shaft 18 frictionally engages the adapter 12 via the shaft aperture 50 when the threaded bolts 30 are securely positioned within the threaded apertures 32, 34 thereby enabling the adapter 12 and the core 14 coupled thereto, via the channel 36 and screws 44, to rotate with said shaft 18.

The semi-circular sections 46, 48 of the core 14 each have a plurality of slots 52 for receiving therein brush filament assemblies 54. The brush filament assemblies each comprise a channel 56 having positioned therein the brush filaments 16. The channel 56 has opposite sides 58; the brush filaments 16 being secured within said channel by pressing the sides 58 together. The channel 56 with its brush filaments 16 is frictionally positioned into each slot 52 of the core sections 46 and 48. The channel 56 is secured within the slot 52 by means of the walls 60 of the slot 52; said walls having their upper portion in the shape of a "y"; said "y" shape creating a smaller opening at the top of the slot 52 than the width of its base "b". The threaded apertures 42 are positioned so as to enable the screws 44 to abut and frictionally engage the core elements 46 and 48 at the center of the "y" configuration of the walls 60.

To install the tire cleaning apparatus 10, the shaft 18 is positioned through each of the retainer bearings 20. The bearings 20 enable the shaft to freely rotate therein. One end of the shaft has coupled thereto universal coupling means 62 suitable for transferring power from a motor 64 via drive means 66 to the shaft 18. There are many means well known in the art for transferring power from a motor to a shaft any of which can be used without departing from the spirit and scope of the invention. One of such means may be a direct gear drive or a belt drive system. When the shaft 18 is positioned within the bearings 20, the pair of split end adapter sections 26 and 28 loosely coupled together over said shaft adjacent the bearing retainers 20. The core sections 46 and 48 forming cylindrical core 14, with the brush filaments 16 coupled thereto, is positioned between the pair of split end adapters 12 having its opposite ends positioned into channel 36 of said adapters; the ends of the core sections 46, 48 frictionally engaging the channel 36. The retaining screws 44 are tightened, frictionally engaging the "y" configuration of the wall 60 of the slot 52. The threaded bolts 30 are tightened securely into threaded apertures 32, 34 creating a frictional coupling between the shaft 18 and the adapters 12 whereby rotary motion imparted to the shaft in turn imparts a rotary motion to the adapters 12, the core 14 and brush filaments 16 coupled thereto.

If additional support for the shaft 18 is required due to the weight of the adapters 12, the core 14 and the brush filaments 16, three bearing retainers 24 can be used. This would create two sections coupled to the same shaft, each section having a pair of adapters 12, a core 14 and brush filaments 16.

It is believed that the invention has been described in such detail as to enable those skilled in the art to understand the same, and it will be appreciated that variations may be made without departing from the spirit and scope of the invention.

The invention as set forth hereinabove can be used for purposes other than for a tire cleaning device for an automatic car wash; for example, it can be used for fruit and vegetable cleaning machines, floor sweepers, and polishers, etc. The size and firmness of the filaments as well as the size of the core, the shaft and split end adapters would vary as required for the specific use intended.

What is desired to secure by Letters Patent in the United States is:

1. An improved tire cleaning apparatus for a car wash facility, said apparatus comprising:
   a shaft;
   a pair of split end adapters each of said pair of adapters being coupled to said shaft, said split end adapters comprising a pair of semi-circular sections coupled together into a circular configuration by a pair of threaded bolts, said split end adapters frictionally engaging the shaft;
   core receiving means positioned within each of said pair of adapters;
   a core formed of two semi-circular sections coupled to the core receiving means of the pair of split end adapters;
   a plurality of brush filament assemblies coupled to the core sections;
   a plurality of retaining screws coupled to each pair of split end adapters and positioned to retain the core within the core receiving means; and
   rotary motion means coupled to the shaft for imparting rotary motion thereto.

2. An improved tire cleaning apparatus for a car wash facility as defined in claim 1 wherein each semi-circular section of the split core further comprises a plurality of slots suitable for receiving the brush filament assembly.

3. An improved tire cleaning apparatus for a car wash facility as defined in claim 2 wherein each of said plurality of brush filament assemblies comprises a channel for receiving and retaining a plurality of brush filaments, each channel being suitable for being received by the slots on each section of the core.

4. An improved tire cleaning apparatus for a car wash facility as defined in claim 3 wherein the core receiving means of each pair of split end adapters comprises a channel having an inner and outer wall, said inner and outer wall defining a space therebetween suitable for frictionally engaging the core.

5. An improved tire cleaning apparatus for a car wash facility as defined in claim 1 wherein said rotary motions means comprises a motor.

* * * * *

UNITED STATES PATENT OFFICE
CERTIFICATE OF CORRECTION

Patent No. 4110861                              Dated September 5, 1978

Inventor(s) DANIEL PECORA

It is certified that error appears in the above-identified patent and that said Letters Patent are hereby corrected as shown below:

Column 3, line 64 - --are-- should be inserted between "28" and "loosely"

Signed and Sealed this

Twelfth Day of June 1979

[SEAL]

Attest:

RUTH C. MASON
*Attesting Officer*

DONALD W. BANNER
*Commissioner of Patents and Trademarks*